US012611956B2

(12) United States Patent
   Bode

(10) Patent No.: US 12,611,956 B2
(45) Date of Patent: Apr. 28, 2026

(54) METHOD AND ARRANGEMENT FOR PROTECTING A CHARGING STATION AGAINST IMPROPER USE

(71) Applicant: Siemens Aktiengesellschaft, Munich (DE)

(72) Inventor: Sebastian Bode, Ahlen (DE)

(73) Assignee: Siemens Aktiengesellschaft, Munich (DE)

( * ) Notice: Subject to any disclaimer, the term of this patent is extended or adjusted under 35 U.S.C. 154(b) by 553 days.

(21) Appl. No.: 17/431,359

(22) PCT Filed: Feb. 14, 2020

(86) PCT No.: PCT/EP2020/053859
   § 371 (c)(1),
   (2) Date: Aug. 16, 2021

(87) PCT Pub. No.: WO2020/169464
   PCT Pub. Date: Aug. 27, 2020

(65) Prior Publication Data
   US 2022/0134898 A1      May 5, 2022

(30) Foreign Application Priority Data
   Feb. 19, 2019   (DE) ......................... 102019202247.2

(51) Int. Cl.
   *B60L 53/65*        (2019.01)
   *B60L 53/30*        (2019.01)
   (Continued)

(52) U.S. Cl.
   CPC ............. *B60L 53/65* (2019.02); *B60L 53/305* (2019.02); *B60L 53/62* (2019.02); *B60L 53/66* (2019.02); *B60L 53/665* (2019.02); *Y02T 90/167* (2013.01)

(58) Field of Classification Search
   CPC ........ B60L 53/65; B60L 53/305; B60L 53/61; B60L 53/66; B60L 53/665;
   (Continued)

(56) References Cited

U.S. PATENT DOCUMENTS 9,270,463 B2     2/2016   Unagami et al.
9,776,525 B2 *  10/2017   Dubrovsky ............. B60L 53/65
   (Continued)

FOREIGN PATENT DOCUMENTS

CA          3059639 A1 *  10/2018   ........... B60L 53/305
CN       102971985 A       3/2013
   (Continued)

OTHER PUBLICATIONS

Lee, S. et al: "Study on Analysis of Security Vulnerabilities and Countermeasures in ISO/IEC 15118 Based Electric Vehicle Charging Technology"; 2014 International Conference on IT Convergence and Security (ICITCS); Beijing; 2014; pp. 1-4.; 2014.
   (Continued)

*Primary Examiner* — Binh C Tat
(74) *Attorney, Agent, or Firm* — Schmeiser, Olsen & Watts, LLP

(57)          ABSTRACT

To protect a charging station LS against improper use, a second identification feature ID2 is also checked in addition to a first identification feature ID 1. The charging process is only authorized or continued if the check of the second identification feature ID2 was also successful. The authentication or authorization is thus implemented in a low-threshold manner by means of an additional authentication, in which a weak identification is supplemented by one or more further automatic identifications, which can also be checked continuously. This means that an authorized and genuine user does not incur any additional expense, while at the same time any damage caused by behavior in breach of
   (Continued)

Figure 1:
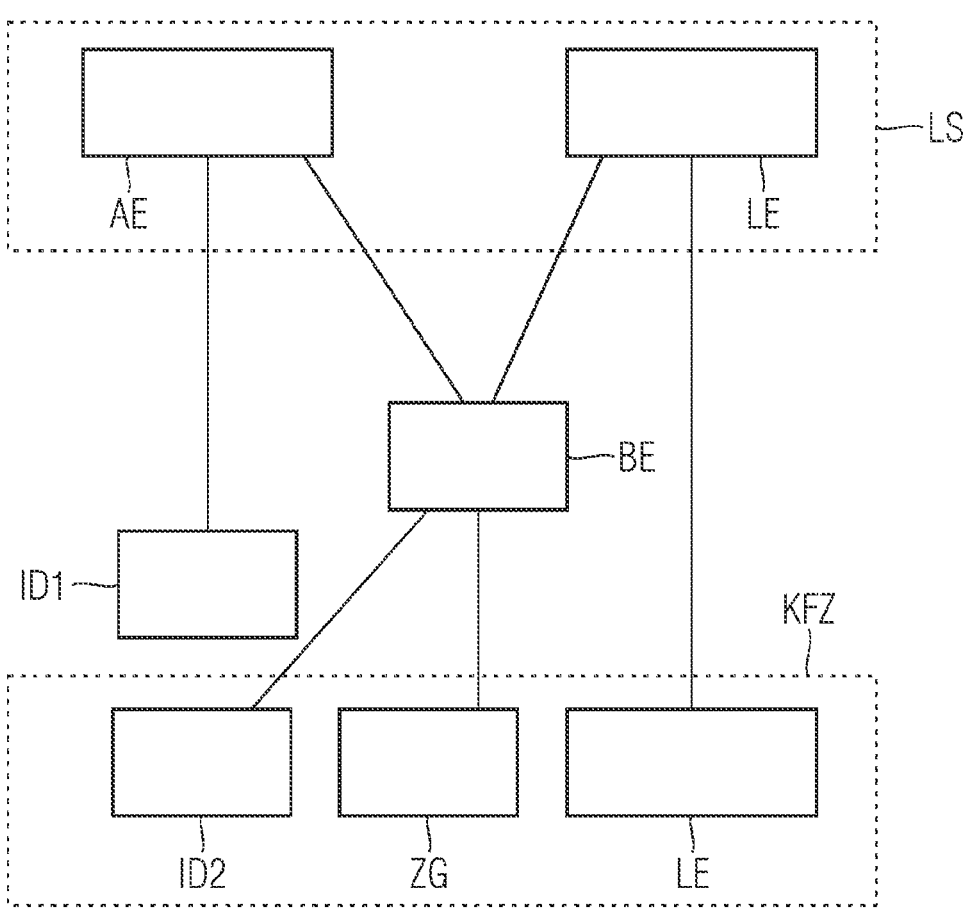

contract by authorized users can be greatly reduced. Related system and methods for protecting against unauthorized use are also disclosed.

13 Claims, 1 Drawing Sheet

(51) Int. Cl.
    *B60L 53/62*         (2019.01)
    *B60L 53/66*         (2019.01)

(58) Field of Classification Search
    CPC .. B60L 2200/10; B60L 2260/32; B60L 53/12;
        B60L 53/51; B60L 2200/12; B60L
        2200/24; B60L 2240/622; B60L
        2240/625; B60L 2240/627; B60L
        2250/10; B60L 2250/16; B60L 2270/36;
        B60L 50/20; B60L 53/16; B60L 53/18;
        B60L 53/31; B60L 53/60; B60L 53/62;
        B60L 53/68; B60L 53/80; Y04S 30/14;
        G06Q 20/409; H02J 2300/22; H02J
        50/005; H02J 50/10; H02J 50/90; H02J
        7/00034; H02J 7/0013; H02J 7/0044;
        H02J 7/0047; H02J 7/0048; H02J 7/35;
        H04L 67/02; H04L 67/125; H04L 67/51;
        H04L 67/61
    USPC ................................................. 320/106–115
    See application file for complete search history.

(56) References Cited

U.S. PATENT DOCUMENTS

| | | | | |
|---|---|---|---|---|
| 9,778,653 | B1 * | 10/2017 | McClintock | G06Q 10/08 |
| 10,343,542 | B2 * | 7/2019 | Wild | B60L 53/65 |
| 10,787,090 | B2 * | 9/2020 | Levy | B60L 53/30 |
| 11,173,802 | B2 * | 11/2021 | Heuer | H02J 7/00045 |
| 11,186,195 | B2 * | 11/2021 | Heuer | B60L 53/65 |
| 11,349,313 | B2 * | 5/2022 | Solomon | G06F 21/31 |
| 2007/0197261 | A1 * | 8/2007 | Humbel | H04L 63/0853 |
| | | | | 455/558 |
| 2010/0084467 | A1 * | 4/2010 | Nishido | G06K 19/0701 |
| | | | | 235/492 |

| | | | | |
|---|---|---|---|---|
| 2012/0326664 | A1 * | 12/2012 | Venegas, Jr. | B60L 53/305 |
| | | | | 320/109 |
| 2013/0099744 | A1 | 4/2013 | Falk et al. | |
| 2013/0252577 | A1 | 9/2013 | Jordan | |
| 2014/0337253 | A1 * | 11/2014 | Berezin | G06Q 50/06 |
| | | | | 705/412 |
| 2015/0095233 | A1 * | 4/2015 | Wild | G06Q 20/40 |
| | | | | 705/44 |
| 2015/0108947 | A1 * | 4/2015 | Heuer | B60L 53/66 |
| | | | | 320/109 |
| 2015/0239357 | A1 | 8/2015 | Huntzicker et al. | |
| 2015/0306967 | A1 | 10/2015 | Cohen | |
| 2016/0059804 | A1 | 3/2016 | Dubrovsky et al. | |
| 2016/0352113 | A1 | 12/2016 | Zhao et al. | |
| 2018/0013211 | A1 * | 1/2018 | Ricci | G06K 7/10257 |
| 2018/0194242 | A1 | 7/2018 | Shumaker et al. | |
| 2018/0336551 | A1 | 11/2018 | Mouftah et al. | |
| 2021/0195541 | A1 * | 6/2021 | Wei | H04W 72/21 |

FOREIGN PATENT DOCUMENTS

| | | | | | |
|---|---|---|---|---|---|
| CN | 103326416 | A | | 9/2013 | |
| CN | 103984976 | A | * | 8/2014 | G06F 21/44 |
| CN | 104539427 | A | | 4/2015 | |
| CN | 104869148 | A | | 8/2015 | |
| CN | 105788333 | A | | 7/2016 | |
| CN | 106183843 | A | | 12/2016 | |
| CN | 106652214 | A | * | 5/2017 | |
| CN | 106878279 | A | * | 6/2017 | B60L 53/31 |
| CN | 107221973 | A | * | 9/2017 | H02J 7/00043 |
| CN | 107277033 | A | | 10/2017 | |
| DE | 102010041760 | A1 | * | 1/2012 | B60L 11/1816 |
| DE | 102015225980 | A1 | * | 6/2017 | |
| DE | 102017206106 | A1 | * | 10/2018 | B60L 53/305 |
| EP | 1775653 | A2 | | 4/2007 | |
| KR | 20060102121 | A | * | 9/2006 | |
| KR | 101764942 | B1 | * | 8/2017 | |
| WO | 2012013427 | A2 | | 2/2012 | |
| WO | 2013144954 | A1 | | 10/2013 | |
| WO | 2014180419 | A1 | | 11/2014 | |

OTHER PUBLICATIONS

PCT International Search Report and Written Opinion of International Searching Authority mailed Aug. 5, 2020 corresponding to PCT International Application No. PCT/EP2020/053859 filed Feb. 14, 2020.

* cited by examiner

METHOD AND ARRANGEMENT FOR PROTECTING A CHARGING STATION AGAINST IMPROPER USE

CROSS-REFERENCE TO RELATED APPLICATIONS

This application claims priority to PCT Application No. PCT/EP2020/053859, having a filing date of Feb. 14, 2020, which is based off of DE Application No. 10 2019 202 247.2, having a filing date of Feb. 19, 2019, the entire contents both of which are hereby incorporated by reference.

FIELD OF TECHNOLOGY

The following relates to the protection of a charging station against improper use. In order to identify customers in electromobility, simple RFID cards are often used. It is known to specifically protect these RFID cards against copying through suitable communication protocols between card and card reader.

BACKGROUND

The conventional art is continually further developing methods for protecting against the copying and imitation of identification features. Using modern methods makes it possible to provide comparatively good protection against use by unauthorized parties. On the other hand, misuse by authorized parties is not able to be ruled out.

Two-factor authentication for registering for Internet accounts is known. In this case, the user has to actively submit two identification features, each of which are implemented using different methods. On the one hand, this constitutes additional effort for the authorized user and, on the other hand, this does not constitute protection against misuse of these credentials by the authorized user, since said user has to be given access to both identification features if he is supposed to use them.

SUMMARY

Embodiments of the present invention are intended to provide an alternative to the prior art.

This is achieved, according to embodiments of the invention, in that a device for protecting a charging station against improper use checks a first identification feature and authorizes a charging procedure if the inspection was successful. The method is characterized in that the first device or a second device checks a second identification feature before and/or during the charging procedure. The charging procedure is continued only if the inspection of the second identification feature was successful.

The arrangement for protecting a charging station against improper use comprises a first device that is designed to check a first identification feature and authorize a charging procedure in the event of successful inspection.

The arrangement is characterized by a design of the first device for checking a second identification feature before and/or during the charging procedure, or by a second device, designed to check the second identification feature before and/or during the charging procedure. The arrangement is furthermore characterized by means for continuing the charging procedure only in the event of successful inspection of the second identification feature.

The advantages mentioned below do not necessarily have to be achieved by way of the subjects of the independent patent claims. On the contrary, these may also be advantages that are achieved only by way of individual embodiments, variants or developments. The same applies to the following explanations.

The first and second device are for example a backend or a server, a processor, for example a microprocessor or microcontroller, a system-on-chip or a programmable digital component, for instance a "field-programmable gate array" (FPGA).

The method and the arrangement are based on the idea of designing an authentication or authorization with a low threshold by way of an additional authentication by supplementing a weak identification with one or more further automatic identifications that are also able to be inspected continually. An authorized and honest user is thus not subject to any more effort, while at the same time expenses caused by behavior in breach of contract by authorized parties are able to be greatly reduced.

The method and the arrangement support protection against unauthorized use of the charging station, for example in the event that a simple RFID card is stolen or used improperly as first identification feature. By way of example, a card of a vehicle of a car-sharing provider could be used to start charging procedures for other vehicles. In the case of DC fast charging, this could cause high expenses in a short time. In the case of AC charging, although corresponding expenses would be able to be incurred only over a longer time due to the lower charging power, it would be possible here to achieve the simultaneous charging of multiple vehicles using a Y-connector, which is easy to manufacture even for laypeople. All of these improper uses of the first identification feature are effectively prevented by inspecting the second identification feature if the second identification feature is chosen appropriately. Some of the suitable selection options are explained in more detail in the embodiments and developments.

According to one embodiment, the second identification feature is checked again fully automatically at predefined time intervals after the charging procedure has begun. The charging procedure is terminated as soon as the inspection of the second identification feature fails.

Improper use by an authorized party is thereby prevented. The embodiment differs from typical IT methods in particular in that excessively high trust in the strength of the authentication when inspecting the first identification feature does not have to lead to very high expenses, since the level of expense depends on the duration of the unauthorized use. The obstacle to the authentication at the beginning is thus intentionally increased only moderately (or even not at all), while it is thereafter continually checked whether any manipulation attempts are present.

In one embodiment, the first identification feature is an RFID card that is checked by a backend. The second identification feature is likewise checked by the backend.

The backend is for example an authentication and authorization server that is provided by an operator of the charging infrastructure.

According to one embodiment, the second identification feature is a location of a mobile terminal.

The mobile terminal is for example a smartphone or a smartwatch carried by a user. The inspection of the location may also simply be implemented in the form of an inspection for local presence.

In one embodiment, the mobile terminal determines its location by way of GPS, mobile radio or WLAN and outputs said location to the charging station. As an alternative, the charging station is equipped with an authentication unit that checks the presence of the mobile terminal in a wireless local area network.

In the first case, the location is retrieved directly from the mobile terminal. As an alternative, the mobile terminal is identified for example on the basis of an identifier, for example a MAC address, in a local WLAN or Bluetooth network. The inspection of the location may also mean merely an inspection for local presence.

According to one embodiment, the second identification feature is the presence of one or more RFID cards. These further RFID cards are located for example in a wallet that a user holds in front of a reader of the charging station.

In one embodiment, the second identification feature is a location of a vehicle.

By way of example, the first identification feature is a charging card that a car-sharing provider has assigned to a particular motor vehicle or a fleet of vehicles. The inspection of the location may also simply be performed as an inspection for local presence. The presence of a motor vehicle from the fleet of the car-sharing provider is thus for example checked as second identification feature.

According to one embodiment, the second identification feature is a state of charge and/or a voltage of a battery of a vehicle and/or a charging current.

Said features may be used and checked as second identification feature during the charging procedure. The charging current is one example of an identification feature that is available immediately after the beginning of the charging procedure. The second identification feature may also be a data record that consists of a multiplicity of features, for example any combination of the possibilities mentioned in the embodiments and exemplary embodiments.

In one embodiment, in the course of the inspection of the second identification feature, it is checked whether the second identification feature corresponds to comparison information provided by a charging control unit in the charging station.

By virtue of this embodiment, it is possible for example to identify whether charging current is being branched off by way of a Y-connector.

According to one embodiment, an additional device is installed in the motor vehicle and outputs the second identification feature.

The additional device makes it possible for instance to inspect the location or the presence of the vehicle even without the involvement of a vehicle manufacturer.

In one embodiment, the vehicle supports a vehicle supply by way of a corresponding communication protocol, in particular in accordance with ISO 15118. The charging station conveys communication between the additional device and the backend.

This embodiment makes it possible to convey the communication via the charging station in the form of a multi-value service. This type of data transmission is beneficial in particular for private users, since it reduces costs for procuring and operating the additional device, and these costs do not have to be inherently taken into consideration.

The computer-readable data carrier comprises a non-transitory computer readable storage medium that stores a computer program that executes the method when it is run in a processor.

The computer program is run in a processor and executes the method in the process.

BRIEF DESCRIPTION

Figure 2:
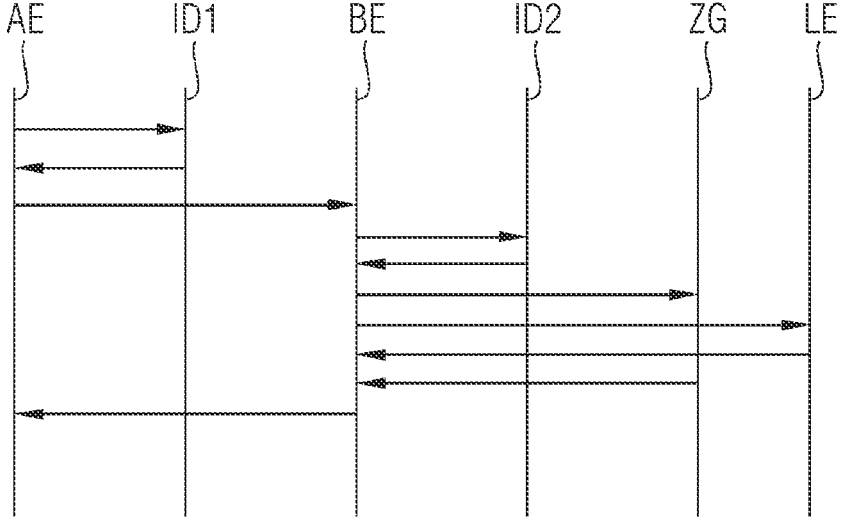

Some of the embodiments will be described in detail, with reference to the following figures, wherein like designations denote like members, wherein:

FIG. 1 shows an exemplary embodiment of an arrangement for protecting a charging station LS against improper use; and FIG. 2 shows an exemplary sequence for protecting a charging station LS against improper use.

DETAILED DESCRIPTION

FIG. 1 shows an exemplary embodiment of an arrangement for protecting a charging station LS against improper use. The charging station has, as first device, an authentication unit AE that is designed to check a first identification feature ID1 and authorize a charging procedure for a vehicle KFZ. If the inspection of the first identification feature ID1 is successful, the authentication unit AE authorizes a charging control unit LE of the charging station LS to provide the charging current for a charging control unit LE in the vehicle KFZ.

As second device, the arrangement comprises a backend BE, for example a server, that is programmed to check a second identification feature ID2 before and/or during the charging procedure, and to continue the charging procedure only in the event of successful inspection of the second identification feature ID2.

In order to protect the charging station, in addition to the first identification feature ID1, at least one further identification feature is thus evaluated, here the second identification feature ID2. The second identification feature ID2 may in this case also comprise multiple different features, or a third or fourth identification feature may also additionally be inspected in addition to the second identification feature ID2. In an embodiment, the second identification feature ID2 is inspected automatically and repeatedly by the backend BE.

In a first scenario, a user of the charging station LS is identified by submitting an RFID card as first identification feature ID1. The authorization of the RFID card may selectively be inspected locally by the authentication unit AE or centrally in the backend BE. The backend BE then additionally inspects a further feature, here the second identification feature ID2. If the RFID card belongs to the user, the location of a smartphone or of a smartwatch of the user may for example be inspected as second identification feature ID2 through a query directly at the device. It is furthermore also possible (using a corresponding receiver in the charging station LS) to inspect the presence of such devices via their identifier in radio networks (for example MAC address in WLAN, Bluetooth). It is also conceivable to acquire further RFID cards as second identification feature ID2 in the event that the user holds an entire wallet in front of a reader of the authentication unit AE.

In a second scenario, the RFID card is assigned, as first identification feature ID1, to the vehicle KFZ that has been leased to the user, for example by a car-sharing or rental car provider. In this scenario, the location of the one or more associated vehicles may also be checked as second identification feature ID2. To this end, an additional device ZG may possibly be installed in the vehicle KFZ such that the method is able to be performed even without the involvement of the vehicle manufacturer. The vehicle-side additional device ZG may in particular also transmit further information, such as for example a state of charge (SoC) of a battery or a battery voltage, this then being able to be compared in the backend BE with values transmitted by the charging control unit LE.

In one variant, the second identification feature ID2 is inspected repeatedly again in order to protect against improper use by an authorized party following an initial check of the identification features. In this case, at the beginning of the charging procedure, further features are available, such as for instance the charging current, these being able to be checked as part of the second identification feature ID2 or in addition thereto.

In a further variant, communication takes place between the backend BE and the additional device ZG in the vehicle KFZ in accordance with ISO 15118. This may be conveyed via the charging station LS in the form of a multi-value service. This type of data transmission is beneficial in this case in particular for private users, since the costs for procuring and operating the additional device are thus reduced and are not incurred inherently.

FIG. 2 shows a flowchart for protecting a charging station against improper use. First of all, an authentication unit AE reads a first identification feature ID1, for example an RFD card, that is held in front of a reader. For the further inspection, the authentication unit AE transmits the first identification feature ID1 to a backend BE. The backend BE then accesses a second identification feature ID2 and checks same. Examples of the second identification feature ID2 have already been cited. The backend BE then requests data from an additional device ZG in a vehicle, for example a state of charge (SoC) of a battery or a battery voltage, and compares these data with information that the backend BE requests and receives back from a charging control unit LE in the charging station. It is thus for example possible to check that no charging current is being branched off using a Y-connector. If all of the inspections are successful, the backend BE reports this back to the authentication unit AE, such that the charging procedure by the charging station is able to be continued.

These inspections for the most part run fully automatically and repeatedly in the background, while the charging procedure has already begun. This results in a relatively unhindered and low-threshold user experience for the user. In the event of fraud, the charging procedure is terminated as soon as the inspection fails.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for protecting a charging station against improper use, in which a first device
   checks a first identification feature and
   authorizes a charging procedure if the inspection was successful,
wherein
   the first device or a second device checks a second identification feature before and/or during the charging procedure, and
   the charging procedure is continued only if the inspection of the second identification feature was successful.
2. The method as claimed in claim 1,
   in which the second identification feature is inspected again fully automatically at predefined time intervals after the charging procedure has begun, and in which the charging procedure is terminated as soon as the inspection of the second identification feature fails.
3. The method as claimed in claim 1,
   in which the first identification feature is an RFID card that is checked by a backend, and
   in which the second identification feature is likewise checked by the backend.
4. The method as claimed in claim 1,
   in which the second identification feature is a location of a mobile terminal.
5. The method as claimed in claim 4,
   in which the mobile terminal determines its location by way of GPS, mobile radio or WLAN and outputs its location to the charging station, or
   in which the charging station is equipped with an authentication unit that checks the presence of the mobile terminal in a wireless local area network.
6. The method as claimed in claim 1,
   in which the second identification feature is the presence of one or more RFID cards.
7. The method as claimed in claim 1,
   in which the second identification feature is a location of a vehicle.
8. The method as claimed in claim 1,
   in which the second identification feature is a state of charge and/or a voltage of a battery of a vehicle and/or a charging current.
9. The method as claimed in claim 8,
   in which, in the course of the inspection of the second identification feature, it is checked whether the second identification feature corresponds to comparison information provided by a charging control unit in the charging station.
10. The method as claimed in claim 7,
   in which an additional device is installed in the vehicle and outputs the second identification feature.
11. The method as claimed in claim 10,
   in which the vehicle supports a vehicle supply by way of a corresponding communication protocol, and
   in which the charging station conveys communication between the additional device and the backend.
12. A computer-readable data carrier, comprising a non-transitory computer readable storage medium storing a computer program that executes the method as claimed in claim 1 when the computer program is run in a processor.
13. An arrangement for protecting a charging station against improper use, comprising:
a first device configured to
   check a first identification feature and
   authorize a charging procedure in the event of successful inspection,
wherein
   the first device is configured to check a second identification feature before and/or during the charging procedure, or
   a second device is configured to check the second identification feature before and/or during the charging procedure, and
      the charging procedure continues only in the event of successful inspection of the second identification feature.

* * * * *